(12) United States Patent
Bezman et al.

(10) Patent No.: US 9,179,091 B2
(45) Date of Patent: Nov. 3, 2015

(54) AVOIDING FLASH-EXPOSED FRAMES DURING VIDEO RECORDING

(71) Applicant: Google Inc., Mountain View, CA (US)

(72) Inventors: Arkady Bezman, Paris (FR); Audrey Ya-Jun Yang, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/212,780

(22) Filed: Mar. 14, 2014

(65) Prior Publication Data

US 2014/0300817 A1  Oct. 9, 2014

Related U.S. Application Data

(60) Provisional application No. 61/788,084, filed on Mar. 15, 2013.

(51) Int. Cl.
*H04N 5/00* (2011.01)
*H04N 5/91* (2006.01)
*H04N 5/213* (2006.01)
*H04N 5/217* (2011.01)

(52) U.S. Cl.
CPC .............. *H04N 5/91* (2013.01); *H04N 5/213* (2013.01); *H04N 5/217* (2013.01)

(58) Field of Classification Search
CPC ......... H04N 5/21; H04N 7/68; H04N 5/2176; H04N 9/888; H04N 5/367; H04N 9/045
USPC ............... 348/616, 617, 246, 241; 386/52
See application file for complete search history.

(56) References Cited

U.S. PATENT DOCUMENTS

| 2006/0152634 | A1 | 7/2006 | Yeh et al. |
| 2008/0231757 | A1* | 9/2008 | Tojo ............................. 348/700 |
| 2008/0232765 | A1* | 9/2008 | Patten et al. .................... 386/52 |
| 2010/0111381 | A1 | 5/2010 | McBeth et al. |
| 2010/0177239 | A1* | 7/2010 | Servais et al. ................. 348/441 |
| 2012/0008854 | A1 | 1/2012 | Shim |

FOREIGN PATENT DOCUMENTS

JP  2011-015381 A  1/2011

OTHER PUBLICATIONS

PCT International Search Report and Written Opinion for PCT/US2014/029351, Aug. 8, 2014, 9 Pages.

* cited by examiner

*Primary Examiner* — Michael Lee
(74) *Attorney, Agent, or Firm* — Fenwick & West LLP

(57) ABSTRACT

A flash removal system identifies and removes flash lighting from a video. The flash removal system identifies flash-exposed frames in the video based on a time stamp of the frame, an average luminance of the frame, or a user input. The flash removal system generates a replacement frame for each identified flash-exposed frame based on at least one frame of the video. The flash removal system replaces the flash-exposed frames with the replacement frames, generating a modified video having reduced flash lighting.

22 Claims, 4 Drawing Sheets

AVOIDING FLASH-EXPOSED FRAMES DURING VIDEO RECORDING

CROSS-REFERENCE TO RELATED APPLICATIONS

This application claims the benefit of U.S. Provisional Application No. 61/788,084, filed Mar. 15, 2013, which is incorporated herein by reference in its entirety.

BACKGROUND

1. Field of the Invention

This disclosure relates to video processing and, in particular, to removing flash lighting from video recordings.

2. Description of the Background Art

Modern cameras and cell phones have merged still photography and video capture capabilities. However, lighting for both videos and still-frame images remains a problem. Low-light still photography typically relies on a short burst of very high-intensity flash for illumination. Consumer-grade video recording, on the other hand, typically does not use flash or other external illumination, and just records low-light images. As a result, recording a low-light video while simultaneously trying to capture one or more still photographs poses a challenge: either have bursts of flash appearing in the video, potentially overexposing frames, or take the still photos in low light and have them be underexposed.

SUMMARY

A method, system, and computer-readable storage medium are provided for removing flash lighting from a video comprising a plurality of frames. Flash-exposed frames are identified, and replacement frames are generated for the identified flash-exposed frames. The flash-exposed frames are replaced with the replacement frames to generate a modified video having reduced flash lighting.

Flash-exposed frames may be identified based on a time stamp of the frame, an average luminance of the frame, or a user input. In one embodiment, replacement frames are generated by duplicating an adjacent frame, e.g., the frame preceding or following the flash-exposed frame in the video. In another embodiment, replacement frames are generated by interpolating motion of pixels between frames preceding and following the flash-exposed frame. In yet another embodiment, replacement frames are generated by rendering the flash-exposed frame as a three-dimensional scene having multiple light sources, subtracting a light source corresponding to the flash lighting, and re-rendering the scene without the subtracted light source The features and advantages described in this summary and the following detailed description are not all-inclusive. Many additional features and advantages will be apparent to one of ordinary skill in the art in view of the drawings, specification, and claims hereof.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
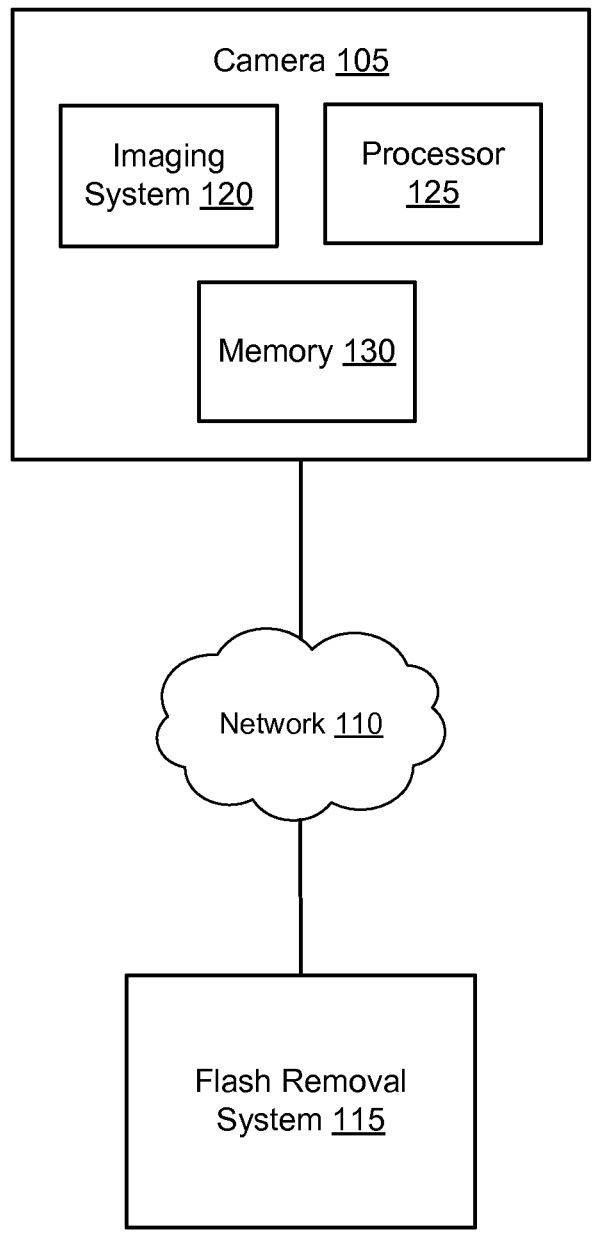
FIG. 1 is a block diagram of an environment for removing flash-exposed frames from a video, according to one embodiment.

FIG. 1 is a block diagram of an environment for removing flash-exposed frames from videos, according to one embodiment. The environment illustrated in FIG. 1 includes a camera 105, a network 110, and a flash removal system 115.

The camera 105 is a standalone digital camera or other device capable of capturing videos. For example, the camera 105 may be a mobile phone having video recording capabilities or a computer configured to capture videos via a webcam. In various embodiments, camera 105 includes one or more additional sensors to provide three-dimensional information about a scene, such as an infrared proximity sensor or a second image sensor for capturing stereoscopic images. Alternatively, the camera 105 may be a plenoptic camera.

As illustrated in FIG. 1, the camera 105 includes an imaging system 120, a processor 125, and a memory 130. Other conventional components of the camera 105, such as an input/output interface, controls enabling a user to specify imaging parameters (e.g., video or still-frame image, zoom level, luminance, shutter speed, and video frame rate), and buttons or a touch screen for user control of the camera 105, are not illustrated so as to simplify and clarify the drawing.

The imaging system 120 is configured to capture a digital video by capturing a plurality of frames and saving the captured frames in the memory 130. In one embodiment, the imaging system 120 includes standard components for capturing digital videos, including a lens, an image sensor, a shutter, and a flash bulb. In capturing the video, the image sensor samples light from a scene at a user-specified frame rate, such as 30 frames per second. Depending on the shutter speed, light may be captured for the full duration of each frame (e.g., 1/30 seconds), or for a period less than the duration of the frames. For example, the shutter may mechanically block the image sensor from light, electrically reset the pixels of the image sensor, or a combination thereof. The luminance of each frame depends in part on the shutter speed. If the brightness of a scene is constant, a slower shutter speed exposes the image sensor to light for a longer period of time. Thus, a frame captured at a slower shutter speed may have greater luminance than a frame captured at a faster shutter speed.

The components of the image system 120 are controlled by the processor 125. In one embodiment, the processor 125 measures the light received at the image sensor to determine the amount of light to be used to correctly expose a scene. For example, a user may specify a desired luminance of the image, and the processor 125 determines whether the available light will provide the specified luminance. If insufficient light hits the image sensor, the processor 125 may trigger the flash bulb to provide additional light. Alternatively, the user may manually define when the flash bulb is to be triggered. The triggered flash bulb emits a flash, which is illuminated for at least a portion of the exposure time of the image.

In one embodiment, the imaging system 120 is configured to capture videos and still frame images simultaneously. During video capture, the user may input a command to the camera 105 to capture an image. In response to receiving the user input, the processor 125 triggers the imaging system 120 to capture a still-frame image of the scene without disrupting the video recording and records a time stamp of the image, specifying a date and time at which the image was captured, in the memory 130. Thus, a still-frame image and a video frame may be captured simultaneously. Because the exposure time for the still-frame image is often shorter than the exposure time of each video frame (e.g., 1/200 second vs. 1/30 second), the processor 125 may determine that additional light is needed to illuminate the still-frame image. The processor 125 may therefore trigger the flash bulb while the image is being captured to provide enough light for the image.

However, if the flash bulb is triggered to provide additional light for the still-frame image, the video frame being recorded while the still image is being captured may be overexposed. Similarly, if other cameras in close proximity to the camera 105 emit flashes, the image sensor may capture flashes from the neighboring cameras in one or more video frames and overexpose the frames. The overexposed frames may cause discontinuity in the video. For example, when a user is playing the video back at a later time, the differences in luminance between frames may cause a flickering effect. Flash lighting thus includes any burst of light having a duration that is short in comparison to the duration of the video, for example lighting intended to illuminate a scene for capturing a still-frame image, or unintentional short bursts of light, such as flashes from other cameras in the proximity of the camera 105.

The flash removal system 115, including one or more computers, detects and removes flash from videos captured by the camera 105. For example, the flash removal system 115 may include computer program instructions stored on a non-transitory computer-readable medium and executable by a processor of a computing device, such as a desktop or laptop computer, a tablet, a smart phone, or the camera 105. Alternatively, the flash removal system 115 may include a server accessed by a web-based video editing tool. The flash removal system 115 receives videos captured by the camera 105 that have one or more flash-exposed frames, processes the videos to remove flash, and outputs modified videos without the flash-exposed frames.

In one embodiment, the flash removal system 115 processes videos after the videos have been captured. The camera 105 uploads the frames of the video to the flash removal system 115, which identifies flash-exposed frames in the video, creates replacement frames for the flash-exposed frames, and generates a modified video with the replacement frames replacing the flash-exposed frames. In another embodiment, the flash removal system 115 processes videos as the frames of the video are captured. For example, the camera may upload each frame or small sets of frames to the flash removal system 115 after capturing the frames, regardless of whether the video recording has been completed.

In one embodiment, the flash removal system 115 generates a user interface for removing flash from videos. The generated user interface may enable users to specify various parameters for removing flash from the videos. For example, the user interface may be part of a video editing tool presented to users uploading videos to a social video sharing website. The parameters that may be set by a user interacting with the user interface may include flash tolerance, which indicates how aggressively the flash removal system 115 is to remove flash from a particular video. The application of flash tolerance in identifying flash-exposed frames, and removing flash from the identified frames, is described in further detail below.

In one embodiment, the camera 105 uploads frames to the flash removal system 115 via a network 110. The network 110 enables communications between the camera 105 and the flash removal system 115, and can comprise the Internet as well as mobile telephone networks. In one embodiment, the network 110 uses standard communications technologies and/or protocols. Thus, the network 110 can include links using technologies such as Ethernet, 802.11, worldwide interoperability for microwave access (WiMAX), 3G, Long Term Evolution (LTE), digital subscriber line (DSL), asynchronous transfer mode (ATM), InfiniBand, PCI Express Advanced Switching, Bluetooth, etc. Alternatively, the network 110 may comprise radio frequency technologies, such as Near Field Communication. In another embodiment, the entities can use custom and/or dedicated data communications technologies instead of, or in addition to, the ones described above. For example, the camera 105 may communicate with the flash removal system 115 through wired communication, such as USB. In an alternative embodiment, the flash removal system 115 is implemented as part of camera 105.

Figure 2:
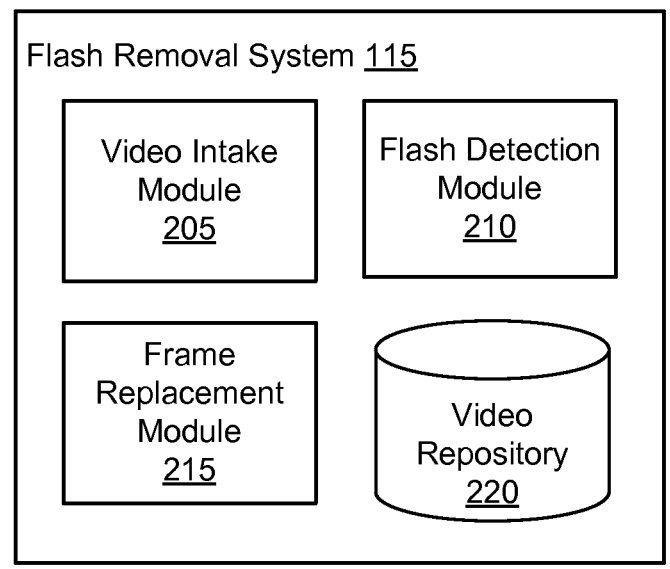
FIG. 2 is a block diagram illustrating modules within a flash removal server, according to one embodiment.

FIG. 2 is a block diagram illustrating modules within the flash removal system 115, according to one embodiment. In one embodiment, the flash removal system 115 comprises a video intake module 205, a flash detection module 210, a frame replacement module 215, and a video repository 220. In other embodiments, the functions described as being performed by the flash removal system 115 may be performed by other entities. For example, some or all of the modules 205, 210, 215 and 220 may be executable by the processor 125 of or stored on the camera 105.

The video intake module 205 receives frames of a video captured by the camera 105. The video intake module 205 may receive individual frames, sets of frames, entire videos, or a bitstream of an encoded video. For example, the frames may be received substantially in real-time as they are captured by the camera 105. The received frames may be in a compressed or encoded format to reduce the communication bandwidth over the network 110. If the frames are in a compressed format, in one embodiment the video intake module 205 decodes encoded frames for subsequent processing. For example, the video intake module 205 may be configured as a decoder compatible with the H.264 standard that decodes the received bitstream and reconstructs each frame based on information extracted from the bitstream.

The flash detection module 210 analyzes the frames received by the video intake module 205 to identify flash-exposed frames. The flash detection module 210 indexes the position of each flash-exposed frame in the video sequence. If the camera 105 supports simultaneous video and image capture, the camera 105 may store a time stamp for each still-frame image, and therefore each flash, in the memory 130. Accordingly, in one embodiment, the flash detection module 210 receives time stamps of images taken during video capture from the camera memory, identifies the frame(s) in the video corresponding to each time stamp, and flags the identified frames as flash-exposed.

In another embodiment, the flash detection module 210 identifies flash-exposed frames based on an average brightness of the frames. In this case, the flash detection module 210 calculates a log-average luminance of each received frame. If a frame has a significantly higher luminance than a frame immediately preceding or following the frame in the video sequence, the flash detection module 210 identifies the frame as flash-exposed. Alternatively, if a frame has a significantly higher luminance than the average across a set of frames (e.g., all frames in the video, or a specified number of frames preceding and following the frame in the video sequence), the flash detection module 210 may identify the frame as flash-exposed.

The amount by which the luminance of frames increases to be considered "significantly brighter" than other frames may be defined by the implementer—for example, either the camera manufacturer, the implementer of flash removal system 115, or an end user. For example, the flash detection module 210 may flag frames having an average luminance more than three standard deviations above the log average luminance of the preceding frames. Alternatively, an amount may be defined by a user via a user interface setting. In one embodiment, the flash detection module 210 receives a user input specifying a flash tolerance. For example, a high flash tolerance may indicate that a frame is not to be identified as being flash-exposed unless the luminance is more than 3.5 standard deviations above the log-average luminance. A low flash tolerance may cause frames having a luminance greater than two standard deviations above the log-average luminance to be identified as flash-exposed. The flash tolerance may alternatively specify a minimum percentage of pixels in a frame having luminance above the log-average luminance for the frame to be identified as flash-exposed. For example, if the flash tolerance is high, the flash detection module 210 may identify a frame as flash-exposed if more than 75% of the pixels in a frame have a luminance three standard deviations above the log-average luminance for the frame. If the flash tolerance is low, the flash detection module 210 may identify a frame as flash-exposed if more than 10% of the pixels have luminance three standard deviations above the log-average.

Allowing users to specify a flash tolerance enables the users to remove undesired flash but keep desired flash. For example, if a user is simultaneously capturing a video and still-frame images of a paparazzi scene in which many flashes from many cameras are going off, the user may wish to keep the majority of the flashes from the other cameras in the video but remove flashes from the user's own camera. Because the flash from the user's camera may illuminate the majority of pixels in a single video frame, but flashes from the other cameras may only appear in the video frame as a few pixels having a higher luminance, a high flash tolerance may remove the user's flash but leave the other flashes in the video.

In another embodiment, the flash detection module 210 identifies flash-exposed frames based on explicit user inputs. Users may manually review the frames of a video for flash-exposed frames, and select the frames to remove from the video. The flash detection module 210 receives the user selections and identifies the selected frames as flash-exposed frames.

The frame replacement module 215 receives the indices specifying the positions of the flash-exposed frames in the video and generates replacement frames for each flash-exposed frame. Each replacement frame is generated based on at least one of the frames in the video. In one embodiment, the frame replacement module 215 generates a replacement frame by duplicating the frame immediately preceding or immediately following a flash-exposed frame. The duplicated frame is substituted for the flash-exposed frame in the video sequence.

In another embodiment, the frame replacement module 215 generates a replacement frame by interpolating the movement and/or color of pixels between the frame preceding and the frame following the flash-exposed frame. To interpolate motion, the frame replacement module 215 may employ a frame interpolation algorithm. For example, the frame replacement module 215 may derive a set of parametric equations describing the projection of a three-dimensional scene onto a two-dimensional image plane, modeling the displacement, velocity, and/or acceleration of pixels in the 2D plane as they relate to the movement of objects of the 3D scene. Based on the derived equations, the frame replacement module 215 determines motion vectors indicating the movement of pixels or groups of pixels from the frame preceding the flash exposed frame to the frame following the flash exposed frame. The frame replacement module 215 interpolates a replacement frame based on the motion vectors.

In another embodiment, the frame replacement module 215 generates a replacement frame by subtracting flash from a flash-exposed frame. The flash-exposed frame is rendered as a three-dimensional scene with multiple light sources. To render each two-dimensional frame in three dimensions, the frame replacement module 215 may receive information from multiple sensors of the camera 105 or information describing the focal length of the camera 105. For example, if the camera 105 includes an infrared proximity sensor, the frame replacement module 215 uses information received from the proximity sensor to determine the depth of objects in the scene represented in the flash-exposed frame. Based on the determined depths, the frame replacement module 215 constructs a three-dimensional representation of the frame.

After rendering, the frame replacement module 215 identifies a light source in the scene corresponding to a flash. In one embodiment, the flash is identified based on a comparison of the flash-exposed frame to another frame in the video (e.g., the frame preceding the flash-exposed frame). For example, the frame replacement module 215 may render the preceding frame in addition to the flash-exposed frame to identify expected lighting for the scene. The flash may be the light source in the rendered version of the flash-exposed frame that is not in the preceding frame. The frame replacement module 215 removes the light source corresponding to the flash and re-renders the scene without the light source.

In yet another embodiment, the frame replacement module 215 deletes the flash-exposed frame, rather than replacing the flash-exposed frame with a replacement frame.

In one embodiment, the frame replacement module 215 selects the method for generating a replacement frame based on the number of flash-exposed frames in a video. For example, a small number of duplicated or interpolated frames may be invisible or minimally visible to a user viewing a video, but a greater number may cause the video to appear discontinuous to a viewer. In one embodiment, if the percentage of flash-exposed frames in the video is less than a threshold percentage (e.g., 1%), the frame replacement module 215 deletes the flash-exposed frame or generates the replacement frame by duplication or interpolation. If the percentage is equal to or greater than the threshold, the frame replacement module 215 generates the replacement frame by rendering the flash-exposed frame and subtracting the light source.

After generating the replacement frame, the frame replacement module 215 replaces the flash-exposed frame with the replacement frame. That is, the frame replacement module 215 removes the flash-exposed frame from the video and inserts the replacement frame at the indexed position in the sequence of frames. The modified video comprising the replacement frames is saved in the video repository 220.

Figure 3A:
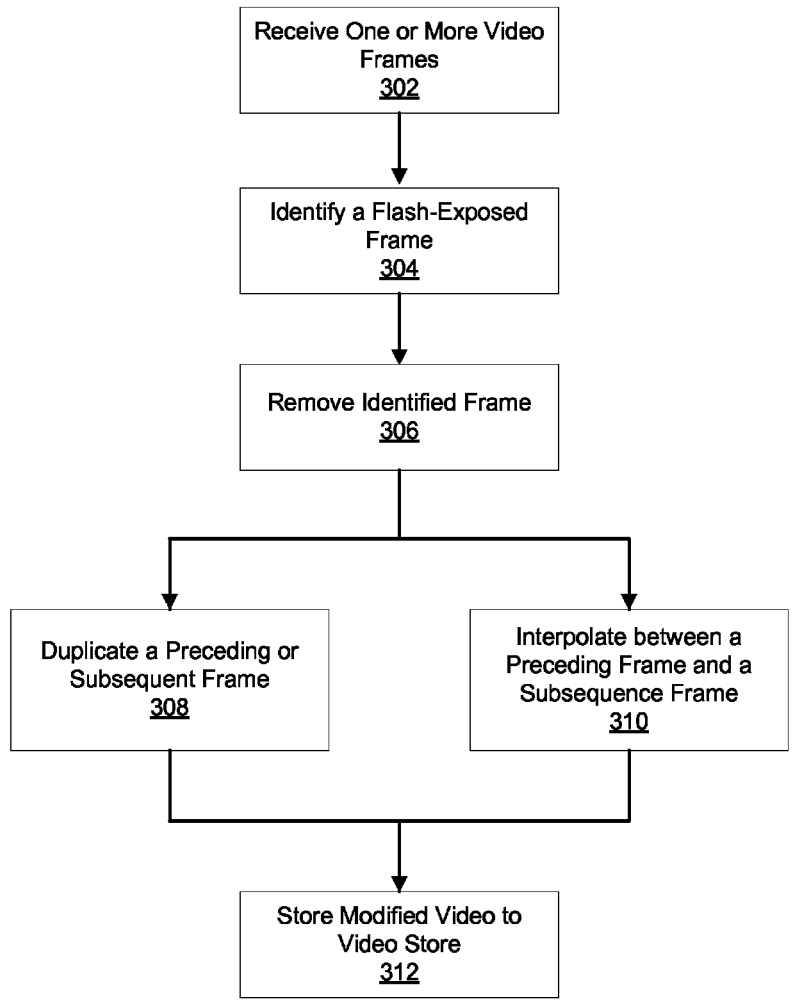
FIG. 3A is a flowchart illustrating a method for removing flash-exposed frames from a video, according to one embodiment.

FIG. 3A is a flowchart illustrating a method for removing flash from a video. In one embodiment, the steps of the method are performed by the flash removal system 115.

The flash removal system 115 receives 302 one or more frames of a video and identifies 304 one or more flash-exposed frames. The flash removal system 115 may identify 304 a flash-exposed frame based on a timestamp of a still-frame image or based on the luminance of the frame as described above. The flash removal system 115 then removes 306 the identified frame.

In one embodiment, the flash removal system 115 duplicates 308 a frame immediately preceding or following the flash-exposed frame to generate a replacement frame. In another embodiment, the flash removal system 115 generates the replacement frame by interpolating 310 motion between the preceding frame and the subsequent frame. The flash removal system 115 replaces the removed frame with the replacement frame to generate a modified video, and stores 312 the modified video to the video repository 220.

Figure 3B:
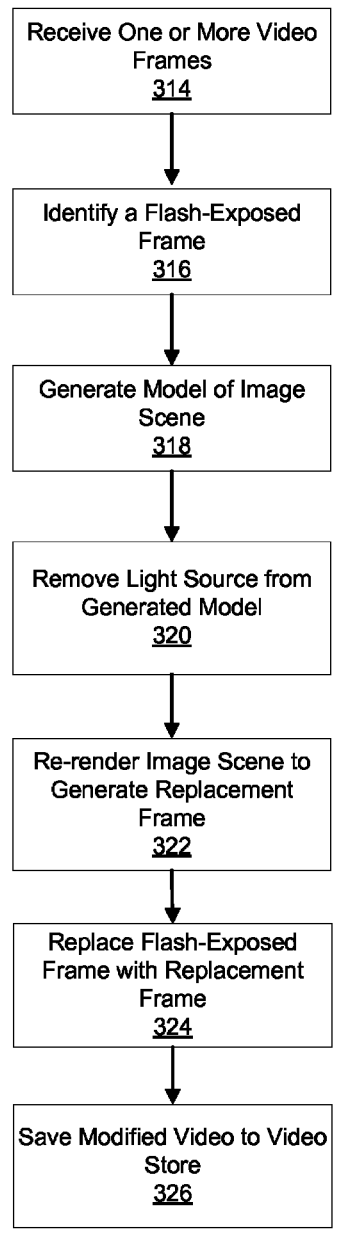
FIG. 3B is a flowchart illustrating an alternative method for removing flash-exposed frames from a video, according to one embodiment.

FIG. 3B is a flowchart illustrating an alternative method for removing flash from a video. In one embodiment, the steps of the method are be performed by the flash removal system 115.

The flash removal system 115 receives 314 one or more frames of the video and identifies 316 a flash-exposed frame. Based on depth data received from one or more sensors of the camera 105, the flash removal system 115 generates 318 a three-dimensional model of the image scene. One or more light sources, corresponding to the flash, are removed 320 from the generated model. After removing the light source, the flash removal system 115 re-renders 322 the image scene to generate a replacement frame. The flash removal system 115 replaces 324 the flash-exposed frame with the replacement frame to generate a modified video, and saves 326 the modified video to the video repository 220.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for removing flash lighting from a video, the method comprising:
  recording a video using a camera, the video including a plurality of frames;
  capturing, by the camera, a still photograph, the capturing including firing of a flash device;
  identifying, by a computer, a flash-exposed frame in the video, the flash exposure resulting from the firing of the flash device during capturing of the still photograph;
  generating a replacement frame for the identified flash-exposed frame, the replacement frame generated using at least one of the other frames in the plurality of frames;
  replacing the flash-exposed frame in the video with the generated replacement frame; and
  storing the video including the replacement frame.

2. The method of claim 1, wherein generating the replacement frame for the flash-exposed frame comprises:
  determining motion vectors describing motion of pixels from a frame preceding the flash-exposed frame to a frame subsequent to the flash-exposed frame;
  interpolating the motion of the pixels between the preceding frame and the subsequent frame based on the determined motion vectors; and
  generating the replacement frame based on the interpolated motion.

3. The method of claim 1, wherein generating the replacement frame for the flash-exposed frame comprises:
  rendering the flash-exposed frame as a three-dimensional scene having a plurality of light sources;
  subtracting a light source of the plurality of light sources;
  re-rendering the three-dimensional scene without the subtracted light source; and
  generating the replacement frame based on the re-rendered scene.

4. The method of claim 1, wherein identifying the flash-exposed frame comprises:
  receiving a time stamp of an image captured during recording of the video; and
  identifying a frame of the video corresponding to the time stamp as the flash-exposed frame.

5. The method of claim 1, wherein generating the replacement frame for the flash-exposed frame comprises:
  duplicating a frame adjacent to the flash-exposed frame in the video.

6. The method of claim 1, further comprising:
  identifying two or more frames of the video as flash-exposed frames;
  responsive to a percentage of the frames of the video identified as flash-exposed frames being less than a threshold:

duplicating a frame adjacent to each flash-exposed frame in the video, and
replacing each flash-exposed frame in the video with a corresponding duplicated frame; and
responsive to the percentage being greater than the threshold:
rendering each flash-exposed frame as a three-dimensional scene having a plurality of light sources,
subtracting a light source of the plurality of light sources from each rendered frame,
re-rendering each three-dimensional scene without the subtracted light sources, and
generating a replacement frame for each flash-exposed frame based on the re-rendered scenes.

7. The method of claim 1, further comprising:
identifying another flash-exposed frame of the video; and
deleting the other flash-exposed frame from the video.

8. The method of claim 1, wherein the computer is located within the camera.

9. The method of claim 1, wherein the computer is in communication with the camera via a network.

10. A camera system comprising:
a camera configured to:
record a video including a plurality of frames; and
capture a still photograph, the capturing including firing of a flash device; and
a flash removal system including:
a processor for executing computer program functions;
a non-transitory computer-readable storage medium storing computer program instructions, the computer program instructions comprising:
a flash detection module, executable by the processor, adapted to receive the video and identify a flash-exposed frame in the video; and
a frame replacement module, executable by the processor, adapted to generate a replacement frame for the identified flash-exposed frame using at least one of the other frames in the plurality of frames and replace the flash-exposed frame in the video with the generated replacement frame; and
a video storage adapted to store the video including the replacement frame.

11. The camera system of claim 10, wherein the frame replacement module is further adapted to generate the replacement frame for the flash-exposed frame by:
duplicating a frame adjacent to the flash-exposed frame in the video.

12. The camera system of claim 10, wherein the frame replacement module is further adapted to generate the replacement frame for the flash-exposed frame by:
determining motion vectors describing motion of pixels from a frame preceding the flash-exposed frame to a frame subsequent to the flash-exposed frame;
interpolating the motion of the pixels between the preceding frame and the subsequent frame based on the determined motion vectors; and
generating the replacement frame based on the interpolated motion.

13. The camera system of claim 10, wherein the frame replacement module is further adapted to generate the replacement frame for the flash-exposed frame by:
rendering the flash-exposed frame as a three-dimensional scene having a plurality of light sources;
subtracting a light source of the plurality of light sources;
re-rendering the three-dimensional scene without the subtracted light source; and
generating the replacement frame based on the re-rendered scene.

14. The camera system of claim 10, wherein the flash detection module is further adapted to identify the flash-exposed frame by:
receiving a time stamp of an image captured during recording of the video; and
identifying a frame of the video corresponding to the time stamp as the flash-exposed frame.

15. The camera system of claim 10, wherein the flash detection module is adapted to identify two or more frames of the video as flash-exposed frames, and wherein the frame replacement module is further adapted to:
responsive to a percentage of the frames of the video identified as flash-exposed frames being less than a threshold:
duplicate a frame adjacent to each flash-exposed frame in the video, and replace each flash-exposed frame in the video with a corresponding duplicated frame; and
responsive to the percentage being greater than the threshold:
render each flash-exposed frame as a three-dimensional scene having a plurality of light sources,
subtract a light source of the plurality of light sources from each rendered frame,
re-render each three-dimensional scene without the subtracted light sources, and
generate a replacement frame for each flash-exposed frame based on the re-rendered scenes.

16. A non-transitory computer-readable medium storing computer program instructions for removing flash from a video, the computer program instructions executable to perform steps comprising:
identifying, by a computer, a flash-exposed frame in a video recorded using a camera, the video having a plurality of frames, the flash exposure resulting from a firing of a flash device of the camera during capturing of a still photograph;
generating a replacement frame for the identified flash-exposed frame, the replacement frame generated using at least one of the other frames in the plurality of frames;
replacing the flash-exposed frame in the video with the generated replacement frame; and
storing the video including the replacement frame.

17. The non-transitory computer-readable medium of claim 16, wherein identifying the flash-exposed frame comprises:
determining an average luminance of the plurality of frames; and
identifying a frame having a luminance greater than the average luminance by at least a threshold amount as the flash-exposed frame.

18. The non-transitory computer-readable medium of claim 16, wherein identifying the flash-exposed frame comprises:
determining an average luminance of the received frames;
determining a frame having a luminance greater than a threshold above the average luminance; and
identifying the determined frame as the flash-exposed frame.

19. The non-transitory computer-readable medium of claim 16, further comprising identifying another flash-exposed frame in the video and generating a replacement frame for the other flash-exposed frame by:
determining motion vectors describing motion of pixels from a frame preceding the other flash-exposed frame in the frame sequence to a frame subsequent to the other flash-exposed frame in the frame sequence;

interpolating the motion of the pixels between the preceding frame and the subsequent frame based on the determined motion vectors; and generating the replacement frame for the other flash-exposed frame based on the interpolated motion.

20. The non-transitory computer-readable medium of claim 16, further comprising identifying another flash-exposed frame in the video and generating a replacement frame for the other flash-exposed frame by:

rendering the other flash-exposed frame as a three-dimensional scene having a plurality of light sources;

subtracting a light source of the plurality of light sources;

re-rendering the three-dimensional scene without the subtracted light source; and generating the replacement frame for the other flash-exposed frame based on the re-rendered scene.

21. The non-transitory computer-readable medium of claim 16, wherein identifying the flash-exposed frame comprises:

receiving a time stamp of an image captured during recording of the video; and identifying a frame of the video corresponding to the time stamp as the flash-exposed frame.

22. The non-transitory computer-readable storage medium of claim 16, wherein the computer program instructions are further executable to perform steps comprising:

identifying two or more frames of the video as flash-exposed frames;

responsive to a percentage of the frames of the video identified as flash-exposed frames being less than a threshold:

duplicating a frame adjacent to each flash-exposed frame in the video, and replacing each flash-exposed frame in the video with a corresponding duplicated frame; and responsive to the percentage being greater than the threshold:

rendering each flash-exposed frame as a three-dimensional scene having a plurality of light sources, subtracting a light source of the plurality of light sources from each rendered frame, re-rendering each three-dimensional scene without the subtracted light sources, and generating a replacement frame for each flash-exposed frame based on the re-rendered scenes.

\* \* \* \* \*